United States Patent [19]

Sydansk

[11] Patent Number: 5,082,057
[45] Date of Patent: Jan. 21, 1992

[54] SAND CONSOLIDATION TREATMENT FOR A HYDROCARBON PRODUCTION WELL BORE USING AN OVERDISPLACEMENT FLUID

[75] Inventor: Robert D. Sydansk, Littleton, Colo.

[73] Assignee: Marathon Oil Company, Findlay, Ohio

[21] Appl. No.: 627,689

[22] Filed: Dec. 14, 1990

[51] Int. Cl.⁵ .......................................... E21B 33/138
[52] U.S. Cl. .................................. 166/295; 166/294; 166/300
[58] Field of Search ............... 166/291, 292, 294, 295, 166/300; 523/131

[56] References Cited

U.S. PATENT DOCUMENTS

| | | |
|---|---|---|
| 2,378,817 | 6/1945 | Wrightsman . |
| 2,476,015 | 7/1949 | Wrightsman et al. . |
| 2,604,172 | 7/1952 | Wrightsman . |
| 2,823,753 | 2/1958 | Henderson et al. . |
| 2,981,334 | 4/1961 | Powell et al. . |
| 3,123,138 | 3/1964 | Robichaux ........................... 166/295 |
| 3,189,091 | 6/1965 | Bearden et al. ..................... 166/295 |
| 3,306,356 | 2/1967 | Sparlin ................................. 166/295 |
| 3,334,689 | 8/1967 | McLaughlin ........................ 166/295 |
| 3,339,633 | 9/1967 | Richardson .......................... 166/295 |
| 3,421,584 | 1/1969 | Eilers et al. .......................... 166/295 |
| 3,476,189 | 11/1969 | Bezemer et al. ..................... 166/295 |
| 3,800,847 | 4/1974 | Rike ...................................... 166/295 |
| 3,978,928 | 9/1976 | Clampitt .............................. 166/294 |
| 4,193,453 | 3/1980 | Golinkin .............................. 166/295 |
| 4,216,829 | 8/1980 | Murphey ........................... 166/295 X |
| 4,427,069 | 1/1984 | Friedman ............................. 166/295 |
| 4,512,407 | 4/1985 | Friedman ............................. 166/295 |
| 4,665,987 | 5/1987 | Sandiford et al. ............. 166/295 X |
| 4,683,949 | 8/1987 | Sydansk et al. ...................... 166/270 |
| 4,688,639 | 8/1987 | Falk ....................................... 166/295 |
| 4,903,770 | 2/1990 | Friedman et al. .................. 166/288 |

FOREIGN PATENT DOCUMENTS 2099886 12/1982 United Kingdom .

OTHER PUBLICATIONS

Chapter 56, Petroleum Engineering Handbook, H. B. Bradley, Editor-in-Chief, Society of Petroleum Engineers, Richardson, Texas (1987).

Primary Examiner—George A. Suchfield
Attorney, Agent, or Firm—Jack L. Hummel; Jack E. Ebel

[57] ABSTRACT

A process is provided for sand consolidation treatment in a subterranean hydrocarbon-bearing formation in fluid communication with a hydrocarbon production well bore. An immature flowing gel is injected through the well bore into a treatment zone of the formation and followed by an overdisplacement fluid which displaces a portion of the immature gel from the zone. Displacement of a portion of the immature gel from the zone establishes flow pathways through the zone for subsequent hydrocarbon production while the gel remaining in the zone matures and effectively consolidates the sand therein.

8 Claims, No Drawings

SAND CONSOLIDATION TREATMENT FOR A HYDROCARBON PRODUCTION WELL BORE USING AN OVERDISPLACEMENT FLUID

BACKGROUND OF THE INVENTION

The invention relates to a process for recovering hydrocarbons from a subterranean hydrocarbon-bearing formation and more particularly to a sand consolidation treatment process for a well bore penetrating a subterranean hydrocarbon-bearing formation.

TECHNICAL FIELD BACKGROUND INFORMATION

Sand control problems arise when a production well bore is drilled into a formation containing unconsolidated or poorly cemented sand particles or other mineral particles commonly found in sandstone formations, such as clays, feldspars, and mica. Inadequate sand control results in the production of such particles into the production well bore from the hydrocarbon-bearing formation. Sand control problems are particularly acute when large drawdown pressures are encountered.

The production of sand and other mineral particles into the well bore is undesirable because a significant fraction of the particles often drop out of the well bore fluids and settle at the bottom of the well bore. The settled particles eventually build up to the producing interval if no remedial action is undertaken. The accumulation of sand at the producing interval reduces the hydrocarbon productivity of the well bore. The particles entering the well bore which do not settle out are produced to the surface. Their presence in the topside production equipment represents a serious risk to the operation of the equipment.

Another negative consequence of sustained sand production is the potential for collapse of the formation. The migration of sand from the formation into the well bore leaves voids in the formation which expand and ultimately collapse. The result can be diminished hydrocarbon productivity from the formation.

A number of technologies exist for sand control. Gravel packing can be effective for sand control, but a number of economic and operational constraints are associated with gravel packing. Gravel packing is often operationally or economically prohibitive to perform on already completed well bores which consequently inhibits the use of gravel packing in many existing well bores. Even in well bores being newly completed where gravel packing is feasible, it is nevertheless relatively expensive, requiring specialized hardware and know-how to properly place a gravel pack in the well bore.

An alternative to gravel packing is the cementing of sand particles together in situ, i.e., sand consolidation, to prevent sand production into the well bore. Plastic resins having utility as cements for sand consolidation treatments are described in U.S. Pat. Nos. 4,427,069; 4,512,407 and 4,903,770 as well as UK Patent No. 2,099,886. However, sand consolidation treatments using resins are not entirely satisfactory. Resins tend to reduce the permeability of the consolidated formation below acceptable levels. In addition, resins are relatively costly on a unit volume basis and can be operationally very difficult to properly place in the formation. Resins also often contain toxic substances which in many cases are environmentally undesirable.

Crosslinked gels have been substituted for resins as cements for sand consolidation treatments. U.S. Pat. No. 3,978,928 discloses a process employing a gel in sand consolidation treatments. However, as with resins, gels tend to reduce the permeability and thus the hydrocarbon productivity of the formation beyond acceptable levels.

As such, a sand consolidation treatment process is needed which overcomes the problems of the above-described treatment processes known in the art. Specifically, a sand consolidation treatment process is needed which is relatively inexpensive, which is easily applied in relatively large volumes, and which effectively promotes sand consolidation without excessive permeability damage to the formation.

SUMMARY OF THE INVENTION

The present invention is a process for consolidating sand in a subterranean hydrocarbon-bearing formation in fluid communication with well bore. According to the process, an aqueous gelation solution is prepared. The immature aqueous flowing gel which results from the gelation solution is injected into the formation via the well bore. The immatur gel is placed in the desired treatment zone where it contacts the sand therein.

An overdisplacement fluid is injected into the formation behind the immature gel slug which is preferably substantially immiscible with the immature gel. The overdisplacement fluid displaces a portion of the immature gel out of the treatment zone away from the well bore and occupies the volume in the treatment zone vacated by the displaced gel. A substantial volume of immature gel, however, is not displaced from the treatment zone and remains therein. The well bore is shut in to enable the remaining immature gel to reach maturity and consequently consolidate the sand in the treatment zone.

After the shut-in time, hydrocarbon production is resumed in the well bore. The hydrocarbons flow without substantial restriction through the consolidated treatment zone into the well bore by displacing the overdisplacement fluid residing in the treatment zone. No significant amounts of sand are produced into the well bore after the consolidation treatment, even under large drawdown pressures.

The process of the present invention overcomes the problems of known treatment processes using sand consolidation cements because the present process limits permeability damage in the treatment zone to acceptable levels while effectively controlling sand production in the well bore. The present sand consolidation treatment process is also in most cases operationally simpler and more economical than conventional gravel packing or resin treatments. Furthermore, unlike gravel packing, the present process has general utility for remedial treatment of well bores which have already been completed, as well as for new well bore completions.

DESCRIPTION OF PREFERRED EMBODIMENTS

The present invention is described below in the context of the following terms. As used herein, the term "sand" refers broadly to silicon dioxide particles as well as other migratable mineral particles which are found in subterranean sandstone formations, such as clays, feldspars and mica.

As defined herein, "sand consolidation" is a treatment process which renders sand in a subterranean formation substantially permanently fixed in the formation and resistant to migration caused by internal or external forces. Although the present invention is not limited to any particular mechanism, sand consolidation is generally believed to be achieved by cementing migratable sand particles to one another with a cementing material which fills at least some of the interstices between the sand particles. The cementing material in the interstices forms large clusters of consolidated particles which are substantially incapable of migration within the formation.

The term "gel" as used herein is directed to a continuous three-dimensional crosslinked polymeric network which has a liquid occupying the interstices of the network. The crosslinked polymeric network provides the gel structure. The term "flowing gels" as used herein refers to gels which are displaceable within the formation by an overdisplacement fluid while "non-flowing gels" are essentially not displaceable in the formation by the overdisplacement fluid, by other fluids injected into the formation, or by fluids produced from the formation.

Gels are further characterized as either "mature" or "immature". A mature gel is one in which crosslinking of the polymer by the crosslinking agent has proceeded to substantial completion either because the crosslinking agent or the crosslinking sites have been substantially consumed. An immature gel is a gel in which crosslinking has not gone to completion because a substantial quantity of available crosslinking sites and crosslinking agent remain. The terms "crosslinking" and "gelation" are used synonymously herein.

An "overdisplacement fluid" is defined as a fluid injected into a formation via a well bore after injection of a treatment fluid which displaces at least a portion of the treatment fluid away from the well bore.

The present invention is a process for sand consolidation in a subterranean hydrocarbon-bearing formation employing an aqueous gel and an overdisplacement fluid. The preferred gel of the present invention is a crosslinked polymer gel comprising a crosslinkable polymer, a crosslinking agent and an aqueous solvent.

The crosslinkable polymer is preferably a carboxylate-containing polymer and more preferably an acrylamide-containing polymer. Of the acrylamide-containing polymers, the most preferred are polyacrylamide (PA), partially hydrolyzed polyacrylamide (PHPA), copolymers of acrylamide and acrylate, and carboxylate-containing terpolymers and tetrapolymers of acrylate. PA, having utility herein, has from about 0.1% to about 3% of its amide groups hydrolyzed. PHPA, as defined herein, has greater than about 3% of its amide groups hydrolyzed.

The crosslinking agent preferably effects crosslinking between the carboxylate sites of the same or different polymer molecules within the gel. Polymer crosslinking creates the network structure of the gel. The crosslinking agent is preferably a molecule or complex containing a reactive transition metal cation. A most preferred crosslinking agent comprises trivalent chromium cations complexed or bonded to anions, atomic oxygen or water. Exemplary crosslinking agents are compounds or complexes containing chromic acetate ($CrAc_3$) and/or chromic chloride ($CrCl_3$). Other transition metal cations which are found in crosslinking agents having utility in the present invention, although less preferred, are chromium VI within a redox system, aluminum III, iron II, iron III and zirconium IV.

The aqueous gel may be prepared in any aqueous solvent in which the polymer and crosslinking agent can be dissolved, mixed, suspended or otherwise dispersed to facilitate gel formation. The solvent is preferably an aqueous liquid such as distilled water, fresh water or a brine.

A number of the most preferred gels which have utility within the present invention are taught in U.S. Pat. No. 4,683,949 which is incorporated herein by reference.

The gel used in the present invention is formed by admixing the polymer, crosslinking agent, and solvent at the surface in a gelation solution. Surface admixing broadly encompasses inter alia mixing of the gel components in bulk at the surface prior to injection or simultaneously mixing the gel components at or near the wellhead by an in-line mixing means while injecting them. Crosslinking is initiated in the gelation solution as soon as the polymer and crosslinking agent contact, thereby forming an immature gel. Crosslinking will proceed under favorable conditions until the immature gel reaches maturity.

The present sand consolidation treatment process is practiced by preparing the gelation solution in the manner described above and injecting a slug of the resulting immature flowing gel into a desired treatment zone of the formation via a hydrocarbon production well bore in fluid communication therewith. The treatment zone is simply the region of the formation wherein sand consolidation is desired, which is made up at least in part of migratable sand particles attributable in most cases to either unconsolidated or poorly cemented sandstone. The treatment zone is usually in the near well bore environment, which is a volume extending radially up about 10 meters or more from the well bore.

The injected flowing immature gel slug displaces much of the mobile fluids occupying the interstitial volume of the sand particles in the desired treatment zone. The mobile fluids typically include brines and hydrocarbons. The result of the injection is a continuous slug of immature flowing gel residing in the treatment zone, and specifically in the interstitial volume thereof. The present process is generally applicable to sand-containing formations and is particularly effective in water-wet formations, wherein the injected immature gel not only occupies the interstitial volume between the sand particles in the treatment zone, but to a large degree simultaneously coats the sand particles therein.

An overdisplacement fluid is injected into the treatment zone following injection of the immature gel while the immature gel is still in a flowing state. An overdisplacement fluid is selected which has the ability to sweep out a sufficient volume of immature flowing gel from the treatment zone to restore acceptable permeability therein to produced hydrocarbons. However, the sweeping ability of the overdisplacement fluid must not be so great that insufficient gel is retained in the treatment zone for effective sand consolidation.

A selection criterion which indicates the ability of the overdisplacement fluid to satisfy the above-recited performance requirements is the viscosity of the overdisplacement fluid relative to that of the initial immature flowing gel. The overdisplacement fluid preferably has a viscosity near that of the immature flowing gel and more preferably somewhat less than that of the immature flowing gel. For a typical flowing immature gel, the overdisplacement fluid preferably has a viscosity from about 0.1 cp to about 1000 cp and more preferably from about 20 cp to about 150 cp.

Another criterion used to select a satisfactory overdisplacement fluid is the mobility ratio. The mobility ratio in the present fluid system, which contains the immature flowing gel and the overdisplacement fluid, is defined as the mobility of the aqueous immature flowing gel phase divided by the mobility of the overdisplacement fluid. The mobility of a given fluid is further defined as its permeability divided by its viscosity. A preferred mobility ratio for the system is between about 0.1 and about 200 and more preferably between about 0.3 and about 150.

In addition to the criteria set forth above, the overdisplacement fluid is preferably substantially immiscible and inert with the immature flowing gel. Immiscible fluids are fluids which do not substantially mix upon contact, but instead substantially remain in their discrete individual phases. This property is particularly beneficial to the practice of the present invention because immiscible displacement is an effective mechanism for displacement of the immature gel from the treatment zone in the manner described hereafter. More preferred overdisplacement fluids are hydrophobic fluids and most preferably hydrocarbon liquids. Exemplary preferred overdisplacement fluids satisfying these criteria include diesel fuel and mineral oil.

The overdisplacement fluid is injected into the treatment zone in a manner which displaces only a portion of the immature gel out of the treatment zone and away from the producing well bore. The overdisplacement fluid preferably drives the immature flowing gel to, or at least near, residual saturation in the treatment zone. The displaced gel is dissipated out into the formation where it has negligible negative impact on subsequent hydrocarbon production into the well bore.

The portion of the flowing immature gel which is not displaced from the treatment zone by the overdisplacement fluid remains in the treatment zone. However, the gel slug is now traversed by one or more continuous flow paths therethrough which are created and occupied by the overdisplacement fluid fingering through the gel slug. Thus, the treatment zone can be characterized as a plurality of sand particles having interstices between the particles occupied by the immature gel and the overdisplacement fluid. The fraction of the interstitial volume occupied by the immature gel is the gel slug. The fraction of the interstitial volume occupied by the overdisplacement fluid is the continuous flow paths through the gel slug.

After injection of the overdisplacement fluid, the production well bore is shut in for a time sufficient to enable the gel slug in the treatment zone to crosslink to maturity. The resulting mature gel sets up in the fraction of the interstitial volume it occupies. The overdisplacement fluid, which remains in a flowing condition, continues to occupy its own fraction of the interstitial volume.

Once the gel has set up, the well bore is returned to production. Hydrocarbons from the outlying formation are freely produced into the well bore across the treatment zone despite the presence of the non-flowing gel slug therein because the interstitial volume occupied by the overdisplacement fluid provides continuous pathways for the hydrocarbons. The hydrocarbons simply displace the mobile overdisplacement fluid from its occupied fraction of the interstitial volume as the hydrocarbons flow therethrough under production drawdown pressure. At the same time the mature gel has sufficient structure to resist displacement from its fraction of the interstitial volume under the drawdown pressure. Consequently the mature gel effectively consolidates the sand particles therein to substantially prevent their migration and production into the well bore.

The following example demonstrates the practice and utility of the present invention, but is not to be construed as limiting the scope thereof.

EXAMPLE

A series of experimental runs are performed in a sandpack to simulate a near well bore sand consolidation treatment. The sandpack is placed in a constant low differential pressure test apparatus and flooded with fluids according to the following procedure.

A 20-30 mesh, 120,000 md Ottawa sand is packed into a holder which is a 15.2 cm long tube having an inside diameter of 0.95 cm. Screens are fitted at both ends of the tube which enable fluids to flow freely through the tube, but prevent sand from escaping. The resulting sandpack is then flooded with tap water to determine its initial permeability to tap water ($k_i$).

A gelation solution is prepared by combining partially hydrolyzed polyacrylamide (PHPA) and chromic acetate in tap water. The PHPA is 3.0% hydrolyzed and has a molecular weight of 500,000. The PHPA concentration in the solution is 6.0 wt. %. The chromic acetate concentration is 6000 ppm. The gelation solution becomes an immature gel having an initial viscosity of 520 cp.

A slug containing 3 pore volumes of the immature gel is injected into the sandpack. Thereafter, a slug containing approximately 4 pore volumes of a liquid hydrocarbon overdisplacement fluid, which is varied for each experimental run, is injected into the sandpack. Both the gel slug and overdisplacement fluid slug are injected at ambient temperature.

The sandpack is then aged at 60° F. for 24 hours to accelerate complete gelation. Tap water is again flooded through the sandpack and the final permeability of the sandpack to the tap water ($k_f$) is calculated. The final permeability is compared to the initial permeability to arrive at the value $k_f/k_i$, which indicates the degree of permeability restoration in the sandpack upon completion of the treatment. Finally the sandpack is cut open for visual inspection and the degree of sand consolidation is qualitatively evaluated.

The results of the experiments are summarized in the table below.

TABLE

| Run No. | Overdisplacement Fluid | Fluid Viscosity (cp) | Initial Gel Viscosity (cp) | $k_f/k_i$ | Degree of Consolidation |
|---|---|---|---|---|---|
| 1 | n-Decane | 0.9 | 520 | 0.003 | Good |
| 2 | Mineral Oil | 85 | 520 | 0.57 | Good |
| 3 | 30-wt Motor Oil | 225 | 520 | 0.64 | Marginal |
| 4 | None | — | 520 | $<1.1 \times 10^{-5}$ | Good |

Of the three overdisplacement fluids, the mineral oil performed optimally under the experimental conditions. Permeability restoration was satisfactory and sand consolidation was good. Motor oil exhibited excellent permeability restoration, but sand consolidation was not totally satisfactory. Conversely, n-decane exhibited good sand consolidation, but poor permeability restoration. The final run without the overdisplacement step was performed as an experimental control and indicates almost no permeability restoration, which would be expected.

It is apparent that selection of an appropriate overdisplacement fluid enables one to effectively practice the process of the present invention. An overdisplacement fluid is selected which has a high enough viscosity and consequently a low enough mobility ratio to restore sufficient permeability to the treatment zone, yet which does not have such a high viscosity and correspondingly low mobility ratio that it sweeps too much immature gel out of the treatment zone during the consolidation step. Thus, an overdisplacement fluid is selected having a viscosity and mobility ratio which strikes a balance between permeability restoration and sand consolidation.

While the particular sand consolidation treatment process as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as defined in the appended claims.

I claim:

1. A process for consolidating sand in a treatment zone of a subterranean hydrocarbon-bearing formation in fluid communication with a well bore comprising:

admixing an acrylamide-containing polymer, a transition metal cation-containing crosslinking agent and an aqueous solvent at the surface to form an aqueous immature flowing gel;

injecting said immature flowing gel into said treatment zone of said formation via said well bore, said immature gel thereby occupying a volume in said treatment zone;

injecting a hydrocarbon overdisplacement fluid substantially immiscible in said aqueous immature flowing gel into said treatment zone to displace a portion of said aqueous immature flowing gel out of said treatment zone, said overdisplacement fluid thereby occupying the fraction of said volume in said treatment zone vacated by said displaced portion of said aqueous immature flowing gel;

shutting in said well bore for a time sufficient for said aqueous immature flowing gel remaining in said treatment zone to mature to a non-flowing gel, thereby consolidating said sand in said treatment zone; and producing hydrocarbons from said formation through the fraction of said volume occupied by said overdisplacement fluid in said treatment zone into said well bore.

2. The process of claim 1 wherein said acrylamide-containing polymer is selected from the group consisting of polyacrylamide, partially hydrolyzed polyacrylamide, copolymers of acrylamide and acrylate, and carboxylate-containing terpolymers and tetrapolymers of acrylate.

3. The process of claim 1 wherein said metal cation is trivalent chromium.

4. The process of claim 1 wherein said overdisplacement fluid is a hydrocarbon liquid.

5. The process of claim 1 wherein the mobility ratio of said immature flowing gel and said overdisplacement fluid is between about 0.3 and 150.

6. The process of claim 1 wherein said overdisplacement fluid displaces said immature gel substantially to residual saturation in said treatment zone.

7. The process of claim 1 wherein said overdisplacement fluid is less viscous than said immature flowing gel.

8. A process for consolidating sand in a treatment zone of a subterranean hydrocarbon-bearing formation in fluid communication with a well bore comprising:

injecting an aqueous immature flowing gel into said treatment zone of said formation via said well bore, wherein said gel comprises an acrylamide-containing polymer and a metal cation-containing crosslinking agent;

injecting a hydrocarbon liquid substantially immiscible with said aqueous immature flowing gel into said treatment zone to displace a portion of said aqueous immature flowing gel out of said treatment zone;

shutting in said well bore for a time sufficient for said aqueous immature flowing gel remaining in said treatment zone to mature to a non-flowing gel, thereby consolidating said sand in said treatment zone; and producing hydrocarbons from said formation across said treatment zone and into said well bore.

* * * * *